United States Patent [19]

Hassenboehler

[11] Patent Number: 5,053,066
[45] Date of Patent: Oct. 1, 1991

[54] NONWOVEN FILTER AND METHOD OF MANUFACTURE

[76] Inventor: Charles B. Hassenboehler, 1806 Mansfield Dr., Knoxville, Tenn. 37918

[21] Appl. No.: 519,132

[22] Filed: May 4, 1990

[51] Int. Cl.$^5$ .................... B01D 39/04; B01D 39/16
[52] U.S. Cl. ........................... 55/521; 55/528; 55/DIG. 5; 131/332; 131/340
[58] Field of Search ........... 55/521, 527, 528, DIG. 5; 131/331, 332, 339, 340

[56] References Cited

U.S. PATENT DOCUMENTS

| | | | |
|---|---|---|---|
| 2,342,924 | 2/1944 | Davidson | 55/521 X |
| 2,954,036 | 9/1960 | Schur et al. | 131/331 |
| 3,039,908 | 6/1962 | Parmele | 55/528 X |
| 3,128,680 | 4/1964 | Schaaf, Jr. | 55/521 X |
| 3,144,025 | 8/1964 | Erlich | 131/332 |
| 3,148,101 | 9/1964 | Allman, Jr. et al. | 55/528 X |
| 3,346,682 | 10/1967 | Thomson | 264/9 |
| 3,444,863 | 5/1969 | Soehngen et al. | 131/267 |
| 3,552,400 | 1/1971 | Berger et al. | 55/528 X |
| 3,595,245 | 7/1971 | Buntin et al. | 131/332 |
| 3,704,192 | 11/1972 | Soehngen et al. | 156/167 |
| 3,855,032 | 12/1974 | Luke | 55/DIG. 5 |
| 3,888,610 | 6/1975 | Brackmann et al. | 425/72 |
| 4,007,745 | 2/1977 | Randall et al. | 55/DIG. 5 |
| 4,189,511 | 2/1980 | Levers et al. | 428/167 |
| 4,261,373 | 4/1981 | Tamaoki et al. | 131/332 |
| 4,546,040 | 10/1985 | Knotek et al. | 131/332 X |
| 4,579,130 | 4/1986 | Coffman | 131/332 |
| 4,807,809 | 2/1989 | Pryor et al. | 131/339 X |
| 4,889,143 | 12/1989 | Pryor et al. | 131/331 |
| 4,961,415 | 10/1990 | Radwanski et al. | 131/332 |

FOREIGN PATENT DOCUMENTS

| | | | |
|---|---|---|---|
| 581753 | 10/1946 | United Kingdom | 55/DIG. 5 |
| 588079 | 5/1947 | United Kingdom | 55/DIG. 5 |

Primary Examiner—Robert Spitzer
Attorney, Agent, or Firm—Robert L. Graham

[57] ABSTRACT

A filter useful as a cigarette smoke filter is made by convergingly passing a flat restrained meltblown web successively through a heated zone and a trumpet to form a roving. The roving may be processed to make filters. The process results in stretch orientation of longitudinal fibers and bulking due to cross fibers. Primary and secondary pleats formed in the web are bundled into a cylindrical roving. The pleats add bulking to the web and provide fluid permeability through the filter.

26 Claims, 4 Drawing Sheets

FIG. 4
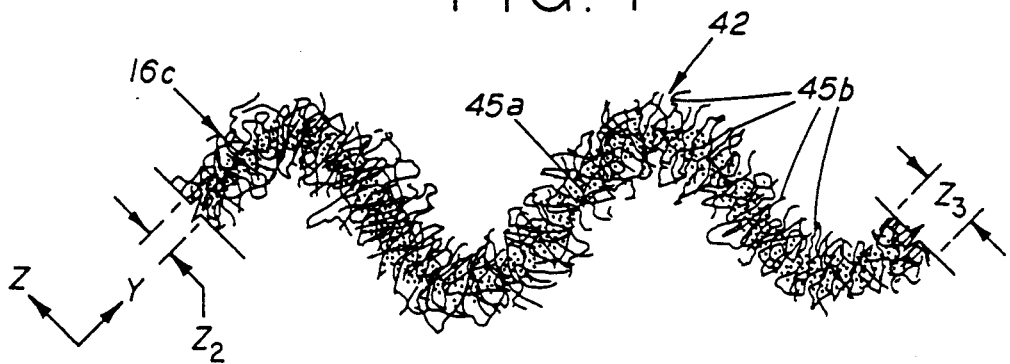
FIG. 6
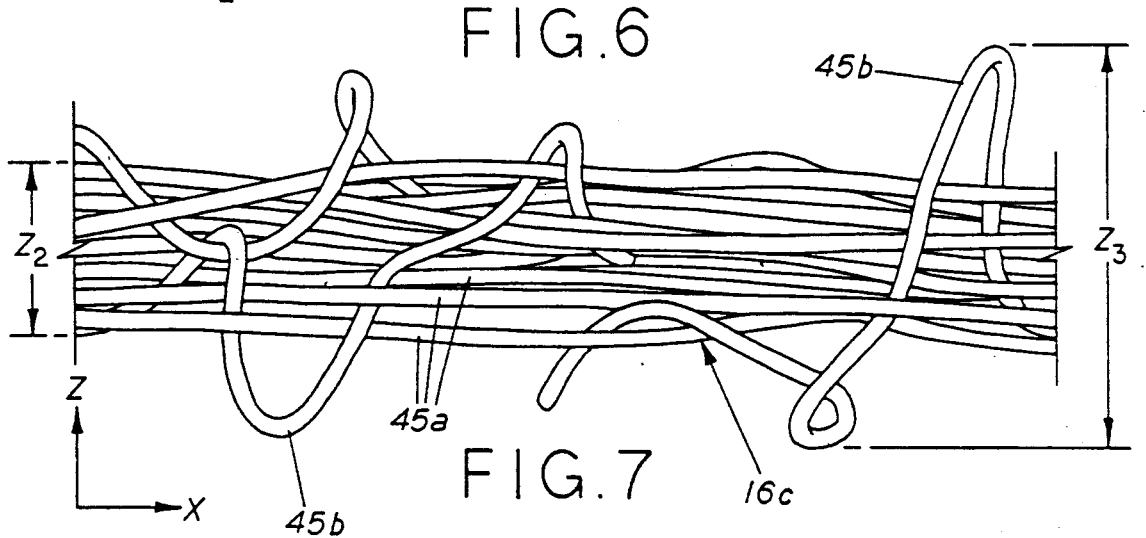
FIG. 7
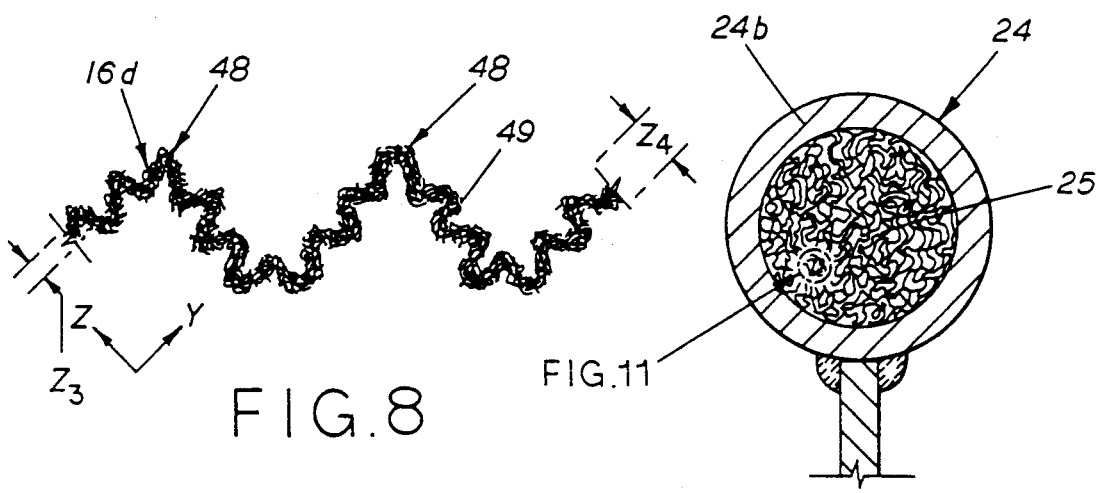
FIG. 8
FIG. 9

NONWOVEN FILTER AND METHOD OF MANUFACTURE

FIELD OF THE INVENTION

The present invention relates to nonwoven fluid filters. In one aspect, the invention relates to air filters, particularly cigarette filters, made from meltblown webs. In another aspect, the invention relates to a method and apparatus for manufacturing filters and roving from meltblown webs.

BACKGROUND OF THE INVENTION

Meltblown products are a particular type of nonwoven material consisting of random collection of thermoplastic, micro-sized fibers ranging in typical average diameters from about 1 to 10 microns. These products are available in the form of webs, cylinders, or rovings and make particularly good filters because of the small pore size in the randomly collected fibers.

Cigarette filters made from meltblown nonwovens, however, have not been particularly successful. It has been difficult to produce the nonwovens in the small cylindrical shape necessary for cigarette filters with the desired filterability and permeability.

U.S. Pat. No. 3,595,245 discloses a polypropylene meltblown cigarette filter. This filter is in the form of a roving produced by a circular meltblowing die. The circular die is expensive and difficult to operate. Moreover, they have not consistently produced filters of the quality necessary for cigarette filters. For these reasons, the cigarette filters of meltblown rovings manufactured from circular dies have not received notable commercial use.

There have been efforts to produce cigarette filters from nonwoven materials in addition to meltblown rovings. U.S. Pat. No. 3,346,682 discloses a cigarette filter made from a thin polymer sheet. The sheet is calendered and slit into tapes; each tape then is bulked and collected in a form suitable for cigarette filters.

U.S. Pat. No. 3,888,610 discloses a method of forming nonwoven rovings useful as cigarette filters. These rovings are produced from individual nozzles.

U.S. Pat. No. 4,059,121 discloses a small disc section of a filter packed with a mass of nonwoven polymeric fibers.

Canadian Patent 841,368 discloses a cigarette filter made from acrylonitrile micro-fibers. The fibers are made by evaporation of a solvent of an acrylonitrile solution and coagulating the polymer.

U.S. Pat. Nos. 3,444,863 and 3,704,192 disclose spray spun filaments which are useful as cigarette filters. These filaments have diameters ranging from 10 to 60 microns and rely on the large diameter variations in the filaments to achieve air permeability.

U.S. Pat. No. 4,189,511 discloses a filter which utilizes a fragment of ruptured film in a fibrous matrix to achieve the balance between pressure drop and filterability.

Many of the above patents, particularly U.S. Pat. No. 4,189,511, address the problem of balanced filterability and pressure drop. For example, a very tight filter will provide effective filtration at relatively high pressure drop, making it difficult for the smoker to suck the smoke therethrough. Thus, a cigarette filter must exhibit effective filterability at relatively low pressure drop.

SUMMARY OF THE INVENTION

The filter of the present invention is manufactured by a process which transforms nonwoven webs of random fibers into a fluid filter or a roving (or tow) which can be further processed into a filter. The filter is particularly suited as cigarette filters because it exhibits good permeability at acceptable pressure differential.

The filter is in the form of a cylinder comprising randomly bundled (as in a roving) and bulked web pleats which extend axially through the cylinder body. The pleats consist of oriented longitudinal fibers and crossfibers. Bulking is provided by secondary pleats formed in the main pleats and by crossfibers which have portions extending or protruding outwardly from the top and bottom surfaces defined by the longitudinal fibers. As described in more detail below, the bulking provides uniform permeability through the bundled pleats.

Preferably, the nonwoven web is meltblown web which comprises randomly entangled thermoplastic fibers having average diameters sized between 1 and 10 microns, generally between 2 to 8 microns.

The process for manufacturing the filter comprises restraining a flat portion of the web and pulling the web convergingly through an orifice restriction (referred to as a trumpet) while heating an intermediate portion of the web between the restrained end and the trumpet. The trumpet preferably has an inside diameter approximately equal to the outside diameter of a cigarette filter or slightly smaller to permit some springback. The convergence between the flat restrained portion of the web to the trumpet is gradual, the included angle being between 10° to 30°. Pulling the web through the trumpet stretches fibers and forms a rod or roving which can then be further processed to form the filter. Alternatively, the system may include in-line facilities for processing the rod or roving in the trumpet or immediately downstream to form a filter rod.

The stretching force imparts machine direction (MD) orientation to many of the fibers, aligning and packing them in the MD. The MD aligned and stretch-oriented fibers are referred to herein as longitudinal fibers. The converging web causes the web to form pleats and secondary pleats that are randomly bundled as they are pulled through the trumpet, forming a roving. The fibers that do not align in the MD are crossfibers. As the web converges, the crossfibers buckle and/or bend and have looped and end portions which protrude outwardly from the layer defined by the longitudinal fibers. This bulks the web and provides permeability for the bundled pleats. Heat applied to the web softens the fibers and enhances the MD orientation of the longitudinal fibers and buckling and bending of the crossfibers. As the web is further stretched upon approaching the mouth of the trumpet secondary pleats begin forming in each leg of the main pleats. The secondary pleats further reduce bending resistance and enhance randomized folding, packing, and bundling of the pleats as the web is pulled through the trumpet.

An important feature of the present invention is the bulking effects provided by the crossfibers. It is believed that the heating and stretching causes the pleats and micropleats (secondary pleats) to form and pack thereby producing a compact random bundling of the pleats. Tests have demonstrated that the filters of the present invention are effective at pressure drops acceptable for smokers.

BRIEF DESCRIPTION OF THE DRAWINGS

FIG. 4 is a sectional view of the web shown in FIG. 3 with the cutting plane 4—4 taken parallel to the MD, illustrating the generally flat, nonbulked web.

FIG. 6 is a sectional view of the web shown in FIG. 5 with the cutting plane 6—6 taken at right angles to the MD illustrating pleat formation and fiber bulking.

FIG. 7 is an enlarged side view (parallel to MD) of a portion of the web shown in FIG. 6, illustrating in more detail the fiber entanglement and the protruding portions of fibers in imparting bulk to the web.

FIG. 8 is an enlarged plan view of a portion of the web at cutting plane 8—8 shown in 2, after web heating and stretching.

FIG. 9 is a sectional view through the filter trumpet as illustrated by cutting plane 9—9 of FIG. 2.

DESCRIPTION OF THE PREFERRED EMBODIMENTS

The present invention will be described with reference to cylindrical cigarette filters, but it is to be understood that the filter and rovings produced by the present invention will have application in other fluid filtration systems such as chromatography and absorption products.

Figure 10:
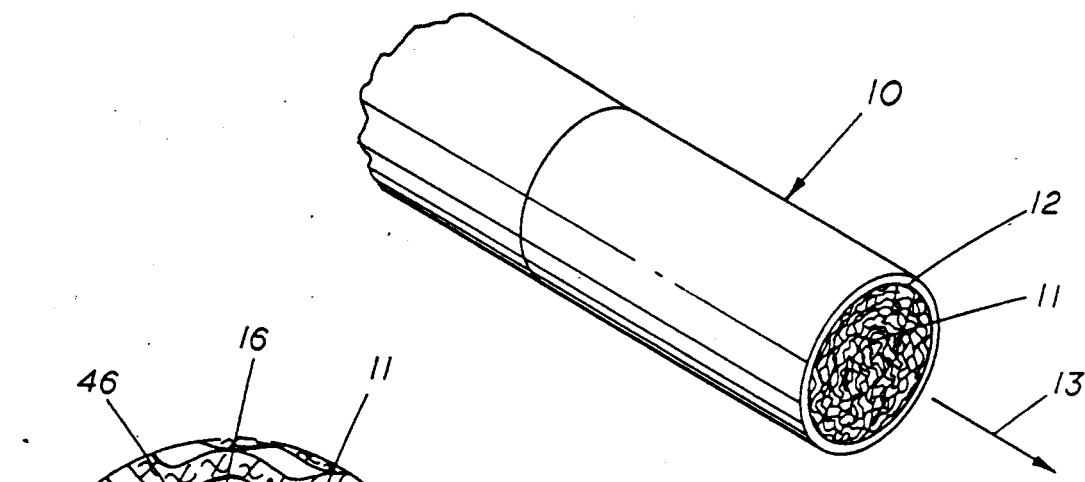
FIG. 10 is a perspective view of a filter manufactured by the present invention shown secured to a cigarette.
Figure 11:
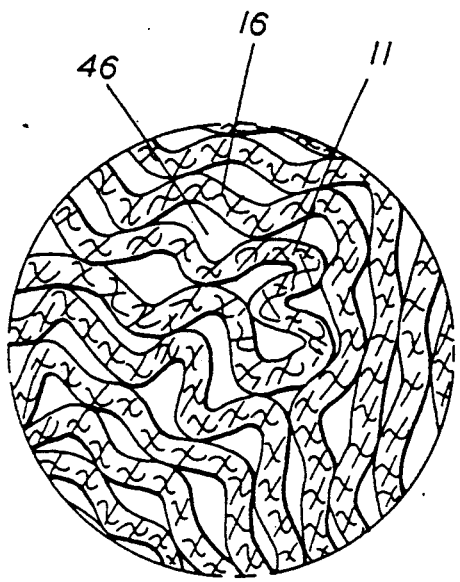
FIG. 11 is an enlarged cross sectional view of a filter or roving produced by the present invention.

The cigarette filter 10 of the present invention, as illustrated in FIG. 10, has a cylindrical shape and comprises a bundle of random pleats 11 formed from a nonwoven web and contained within wrapper 12 (e.g. paper). The pleats 11 are randomly bundled to form the cylinder and extend generally longitudinally with respect to the cylinder axis. As shown in FIG. 11, the shape of the pleats 11 and arrangement of the fibers therein due to bulking provide the necessary balance of filtration and pressure drop. It should be noted that although smoke constituents can diffuse into the bulked web roving, the air flow through the filter 10 indicated by arrow 13 in FIG. 10 is generally parallel to the longitudinally extending pleats 11.

The process steps for manufacturing the filter 10 will be described with reference to the apparatus shown in FIGS. 1 and 2 and the effects of these steps on the nonwoven web fibers with reference to FIGS. 3 through 9.

The apparatus according to the present invention comprises four main components: (a) means for dispensing a nonwoven web in a generally planar disposition., (b) an orifice restriction (e.g. trumpet); (c) means for pulling the web through the trumpet and applying a MD pulling force or tension on the web to stretch orient the fibers of the web; and (d) means for heating an intermediate portion of the web in advance of the trumpet. The term planar, as used herein means flat or, if curved, unruffled.

The filter or roving is made by pulling a nonwoven web through the trumpet, which causes the web to converge, forming main pleats and secondary pleats. The main pleats and micropleats (secondary pleats) are randomly bundled together as they are pulled into the trumpet forming a structure illustrated in FIG. 11.

Figure 1:
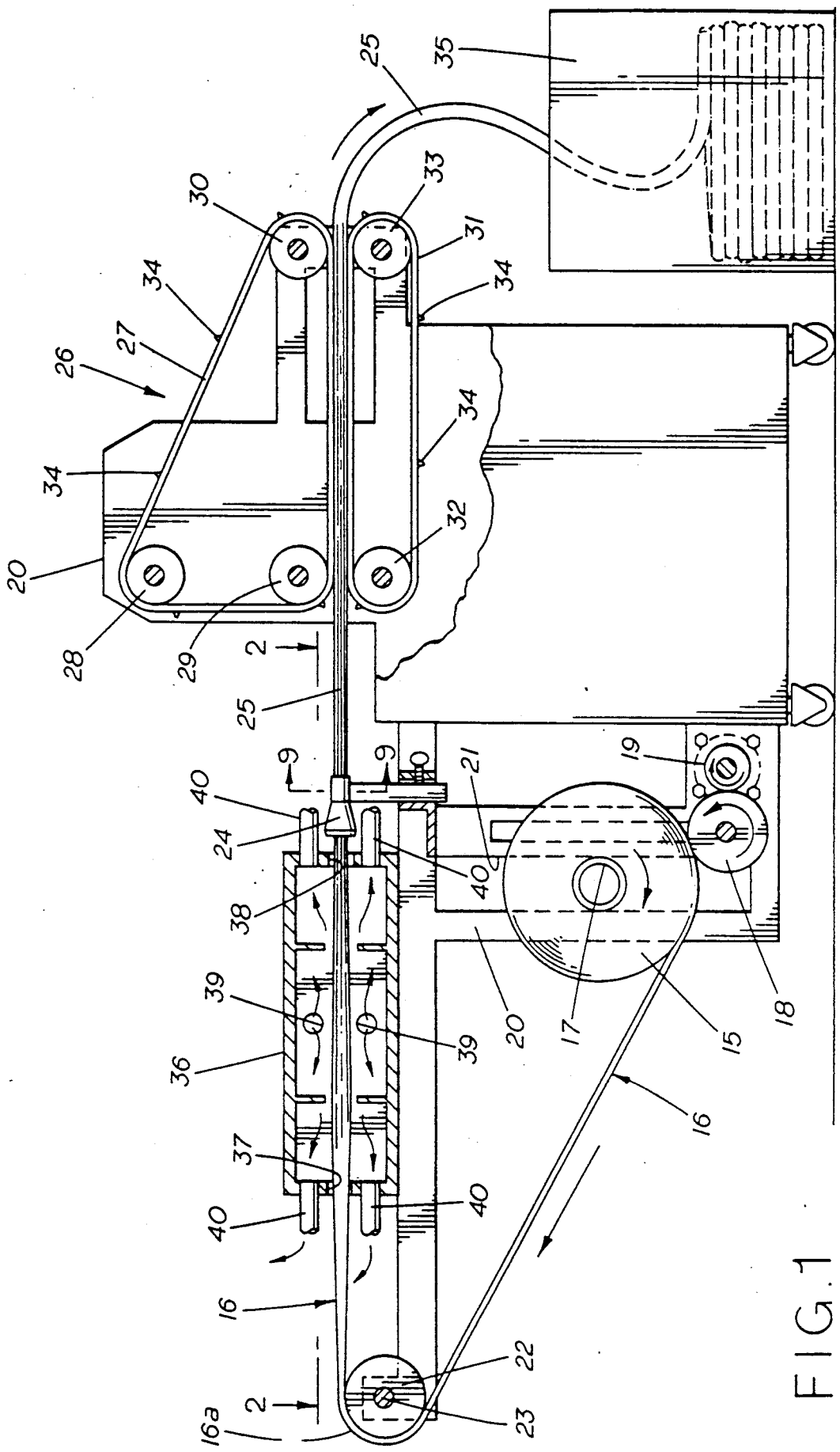
FIG. 1 is a side elevational view of apparatus for carrying out the process of the present invention.

As illustrated in FIG. 1, a roll 15 of nonwoven web 16 is mounted on apparatus frame 20 by means of roll shaft 17. Opposite ends of shaft 17 fit in spaced vertical slots (one shown as 21) provided in the frame 20 so that the roll 15 is free to move vertically within slots 21. A restraining roller 18 mounted on the frame 20 bears against a lower surface of the roll 15. Restraining roller 18 is geared to a driven roller 19 which is driven by a variable speed electric motor with suitable gear reduction means to control the rotation of roller 18 and hence the feed rate of web 16 dispensed from web roll 15.

The web 16 is dispensed from the roll 15 and extends around idler roller 22 which has its opposite ends journaled to frame 20 by shaft 23. The web 16 extends around idler roller 22 and through an orifice (trumpet 24). The web 16 is pulled through trumpet 24 by a belt assembly 26. The trumpet 24 may be a conventional trumpet used in the manufacture of cigarette filters having a tapered opening 24a and a restriction portion 24b. Trumpet 24 may also have adjustable size cross section feature that permit opening to easily insert the web at start-up, such as a race track cross section with adjustable length straightaways. Portion 24b defines the orifice restriction and has an inside diameter (ID) less than or approximately equal to the diameter of a cigarette filter. The trumpet 24 is secured to frame 20 as shown in FIG. 1.

As the web 16 passes through the trumpet 24, it is shaped in the form of a circular roving (or rod) 25. The belt assembly 26 engaging opposite sides of the roving 25 serves to pull the stretched web 16 through the trumpet 24. The belt assembly 26 comprises a driven stiff belts 27 and 31 mounted on rollers 28, 29, and 30 that are supported on frame 20. Rollers 28 and 32 may each be driven by a variable speed electric motor with suitable gear reduction to drive the belt 27 counterclockwise as viewed in FIG. 1 at the desired linear speed. Belt 31, trained around rollers 32 and 33 is vertically aligned with belt 27. Transverse rubber cleats 34 provided on belt 27 grip the roving 25 and apply the pulling force. Thus, belts 27 and 31 engage opposite sides of roving 25 so that movement of belt 27 causes the roving to move to the right as viewed in FIG. 1.

The belts 27 and 31 have sufficient width to provide adequate contact on the roving 25.

The roving 25 may be collected in a suitable container 35 for later processing into filters.

A heater box 36 is mounted on frame 20 and serves to heat the web 16 as it convergingly moves from roller 22 to trumpet 24. The web enters box 36 through opening slot 37 and exits through slot 38. Heated air supplied by a furnace and blower (not shown) enters the box 36 at inlets 39 and is withdrawn through air outlets 40, and conducted to the furnace for recycling. The box 36 may be provided with baffles to impart a serpentine flow pattern to the air (shown in FIG. 2 by arrows 41) within box 36. Alternatively, the air may be directed perpendicular to each face of the web (vertical direction). The heated air contacts the top and bottom surfaces of web 16 within box 36. Other types of heaters such as electric heaters may also be used.

Figure 2:
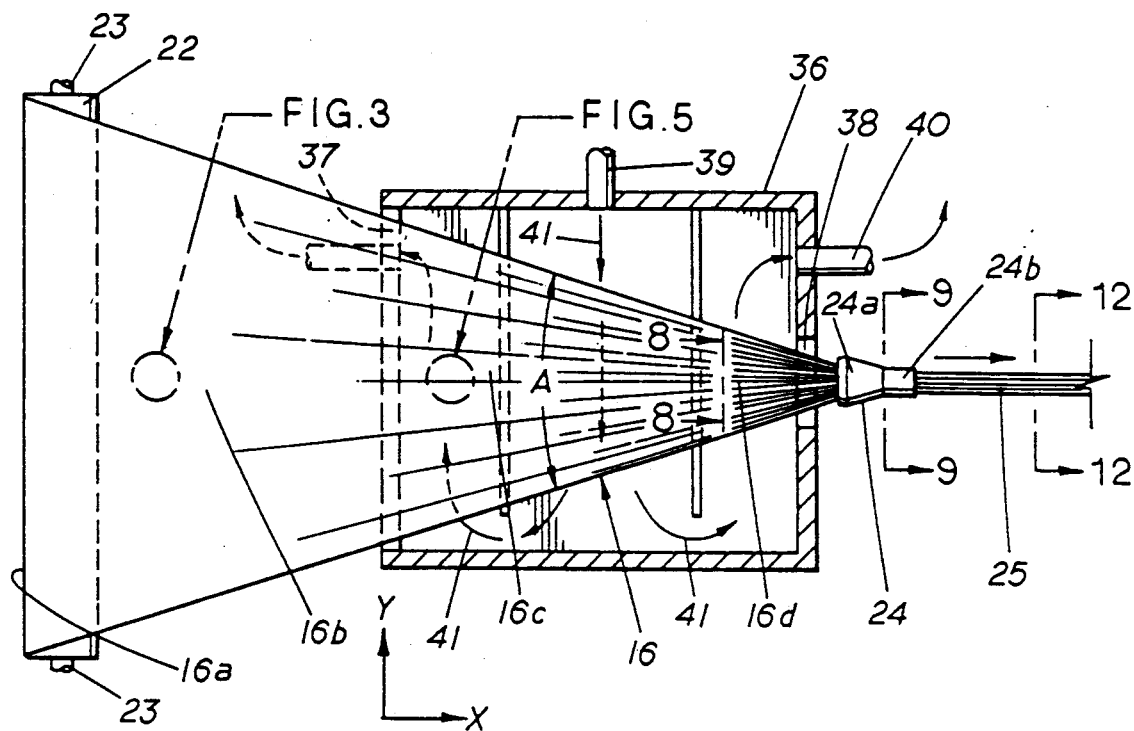
FIG. 2 is a plan view of portions of FIG. 1, illustrating the web pattern in filter formation, and is a sectional view of a portion of the apparatus of FIG. 1 with the cutting plane through line 2—2 thereof.

Referring to FIG. 2, the web 16 is pulled from the substantially flat restrained end at 16a convergingly through heater box 36 and through trumpet 24 to form the circular roving 25, or other shapes depending on the cross section of the trumpet 24. The web 16 passes successively through three distinct zones in making the transition from a flat web 16a to a circular or generally oval, compact roving 25: zone 16b where the web is in the form of large pleats; zone 16c where the fibers of the web are heated to a temperature to soften the fibers that enhance stretching in the machine direction and narrowing in the transverse direction; and zone 16d where the fibers of the pleats cause the formation of the secondary pleats that bundle randomly while converging to the trumpet 24.

For most polymers, temperatures in the heated zone in the range of 45° C. to 200° C. (preferably 100° C. to 175° C. for polyolefins) are satisfactory. It is preferred that the heat supplied increases the temperature of the web to a temperature at or near the rubbery state (e.g. within 10° C.) of the polymer employed by at least 20° C. and preferably at least 35° C. and most preferably by at least 50° C.

In certain applications such as in-line web production and processing according to the present invention, the hot web dispensed from the collector of the nonwoven line may be heated by only 10° C.-20° C. in the heated zone to place the polymer in the rubbery state.

Figure 3:
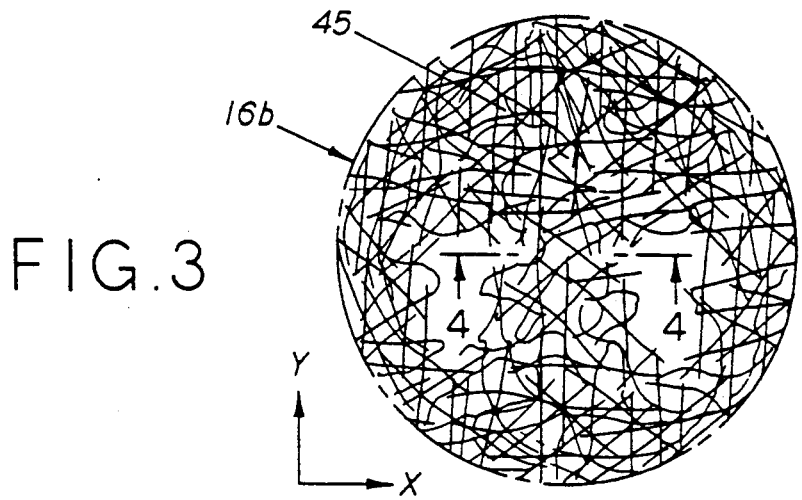
FIG. 3 is an enlarged plan view of a portion of the web shown in FIG. 2.

As shown in FIGS. 3 and 4, the fibers 45 of the flat web 16a are generally random laid fibers which extend randomly within the plane of the web 16. For purposes of description "X" refers to the machine direction (MD), "Y" refers to the transverse direction (TD), and Z refers to vertical direction (VD).

Although meltblown webs are considered by many to consist of generally continuously filaments, for purpose of description herein, the filaments will be referred to as directed fibers. Thus, segmented continuous filaments is considered a collection of fibers in the web.

The MD tensioned web at 16a is generally flat in the X-Y plane as in FIG. 4. As the web 16 enters zone 16b, the sides of the tensioned web 16 converge and main pleats form.

Figure 5:
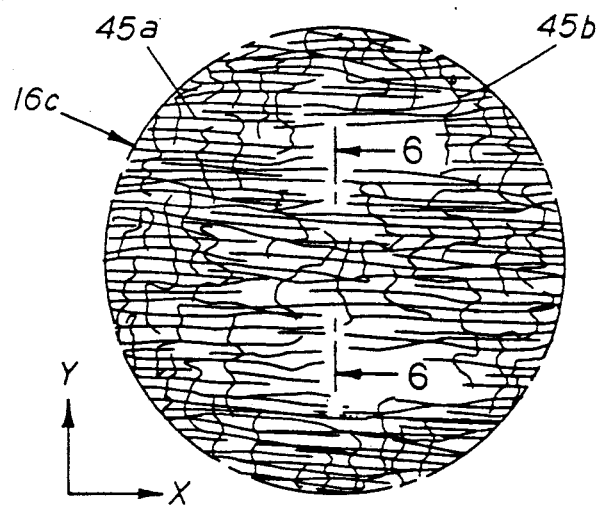
FIG. 5 is an enlarged plan view of a portion of the web shown in FIG. 2.

As the generally pleated planar web of 16b enters zone 16c, the web is heated and elongated and the fibers 42 assume different directions: most fibers 45a are pulled and aligned in the MD (X-direction) becoming longitudinal fibers with some fibers 45b compressed and buckled remaining crosswise with the longitudinal fibers. These fibers 45b are referred to as crossfibers. (FIG. 5 illustrates the longitudinal fibers 45a and crossfibers 45b.) The large pleats resulting from fiber orientation and transformation in the zone 16c are illustrated in FIG. 6. The orientation of the longitudinal fibers 45a stretched in the MD causes the crossfibers 45b to fold and project outside the upper and lower surfaces defined by the longitudinal fibers 45a in the Z direction. A comparison of FIGS. 4 and 6 reveals the degree of buckling produced by the crossfibers 45b. Note that the thickness ($Z_2$) of the web defined by the longitudinal fibers 45a is less than the thickness ($Z_3$) of the web defined by the crossfibers 45b. This is due to the buckled crossfibers 45b slightly expanding the longitudinal fiber array and protruding outside the thickness defined by the longitudinal fibers 45a. $Z_2$ is approximately equal to $Z_1$ of FIG. 4. FIG. 7 is a drawing of an actual magnified (400×) photomicrograph that show the actual shape of the cross fibers 45b in creating the bulking. As illustrated, the bulking is due to crossfibers folding and protruding beyond the longitudinal fibers 45a in the Z direction.

As the converging web 16 passes through zone 16c, the heating softens the fibers 45a and 45b, permitting further MD orientation of the longitudinal fibers 45a and further enhancing the bending and/or folding of the crossfibers 45b. As the web continues to converge, it has been discovered that secondary pleats form in the large pleats of web 16 like an accordian as illustrated in FIG. 8. Thus, as the web 16 passes into the critical zone 16d, the pliable crossfibers 45b and the secondary pleats permit the web 16 to randomly bend, fold, and compact densely as the web is pulled through the trumpet 24. The secondary pleats and the main pleats also add to bulking of the web 16 ($Z_4$ in FIG. 8). It is the combination of the buckling, bulking action and enhanced bendability of the converging web by the heating and stretching that provides the filter with unique structure illustrated in FIG. 11.

FIG. 11 illustrates the random packing of the bulked web 16 in the final roving 25. The secondary pleats provide a plurality of bends within each pleat so that when the web 16 is forced into the trumpet 24, the web can readily conform to the circular configuration. Each secondary pleat provides a potential bend site for the converging web. Tests have shown that as the web 16 approaches the mouth of the trumpet, the lines of potential bend sites provided by the secondary pleats permits the main pleats to multiply. When bundled in the trumpet, the main pleats and secondary pleats bend and fold in a random serpentine pattern. It is difficult to distinguish the secondary pleats from the main pleats.

The overlapped main pleats and secondary pleats, because of their undulating configuration provide a multiplicity of air passages 46 therebetween as shown in FIG. 11. It is important to note that the air flow through passages 46 through the filter is generally parallel to the pleats, and that the permeability of air through the filter is largely maintained by the bulked fibers. It is also believed that the secondary pleats permit the compact packing with consistent permeability without large nonuniform air spaces.

As indicated above, bulking of the web 16 refers to the extension or protrusion of the crossfibers in the Z direction, and the secondary pleats superimposed on the main pleats. Preferably, bulking should be at least 20%, preferably at least 30% and most preferably at least 50%; that is, the thickness $Z_4$ of the web 16 is increased preferably by at least 30% and most preferably at least 50% over $Z_1$. The upper limit of bulking depends on several factors, but maximum bulking in the order of 200 to 300% are possible.

Figure 13:
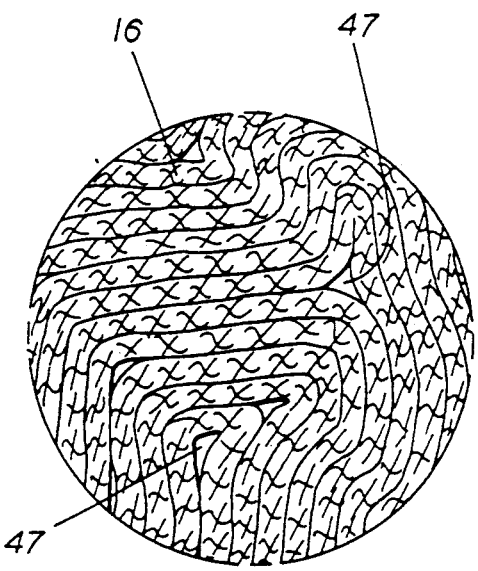
FIG. 13 is an enlarged cross sectional view of a roving produced by pulling a web through a trumpet without MD stretching.

Tests have shown that without the bulking, the pleats of the web 16 become so tightly packed that air cannot flow through the filters at acceptable differential pressures. FIG. 13 is an enlarged cross-sectional view of a filter made from non-bulked fibers. Note the presence of the main pleats but the absence of the secondary pleats. Also, if secondary pleats are not formed in the web 16, the bending of the web creates non-uniform eye needles as at 47.

As indicated above, the method of the present invention comprises three main steps: (a) dispensing the web 16 in a substantially flat disposition (e.g. at 16a); (b) pulling the web 16 through an orifice restriction 24 having a diameter approximately that of the filter; and (c) heating the web in an intermediate zone between the 16a and the orifice restriction 24.

Pulling the restrained web 16 through the restriction 24 tensions the web and forms pleats as the web converges, and the heating step relaxes the fibers 41 enhancing MD stretching and orientation of fibers. The resultant TD contraction enhances microplead formation and bending and buckling of the crossfibers 45b in the web 16.

Important consideration for this invention are the material and the process parameters.

MATERIAL PARAMETERS

Meltblown Web:

It is important for purposes of this invention that particular types of meltblown webs be used, both in weight basis and dimensions.

Meltblowing is a process for forming nonwoven webs having microfibers of general random disposition in two dimensions (i.e. in the X-Y plane). Briefly, the meltblowing process involves extruding a molten resin from a row of orifices formed in a die. The fibers discharging from the orifices are stretched and attenuated by hot air discharging from the die on opposite sides of the orifice row. The fibers are laid down, self bonded and collected on a collector drum or conveyor in a random pattern (typically as shown in FIGS. 3 and 4). Apparatus and process for manufacture of meltblown webs are disclosed in U.S. Pat. Nos. 4,818,463 and 3,978,185, the disclosures of which are incorporated herein by reference.

Variations in the meltblowing process permit the production of webs of diverse description and sizes. The surface and bulk textures of the web can be modified (for specific applications) by using combinations of air discharge rates, due to collector distances, collector textures, and other processing parameters in web production. These variations can be readily optimized for a particular end use by those skilled in the art. The thermoplastic polymer and webs useful in the present invention are described below.

Thermoplastic Resin:

polyolefins (including polyethylene, polypropylene, copolymers and terpolymers thereof), polyesters, nylon, EVA, elastomers, polyamides, polystyrene, polytrifluorochloroethylene, and blends of these. The preferred resin are the polyolefins, including homopolymers and copolymers of the family of polypropylenes, polyethylenes and higher polyolefins. The most preferred resins are the homopolymers and copolymers of ethylene and propylene. Polyethylenes include LDPE, HDPE, LLDPE, and very low density polyethylene. Polypropylene is the most common resin used. The MFR and MW of the meltblowing resins are well known to those skilled in the art.

Thermoplastic Web:

The physical properties of the meltblowing webs useable in the present invention are as follows:

|  | BROAD RANGE | PREFERRED RANGE | MOST PREFERRED RANGE |
| --- | --- | --- | --- |
| Fiber size (av. diam.) | 0.5–20 microns | 1–10 microns | 2–8 microns |
| Web Thickness: | 1–25 mils | 2–15 mils | 3–8 mils |
| Web Width: | 6–60 inches | 12–60 inches | 16–40 inches |
| Web Aspect Ratio* | 240–60,000 | 800–24,000 | 2,000–13,000 |
| Web Basis weight: | 2–52 g/m$^2$ | 4–26 g/m$^2$ | 5–17 g/m$^2$ |

*width to thickness of the web

The values of the fiber size, Aspect Ratio (dependent on thickness and width) and basis weight shown above are interchangeable.

The micro sized fibers are ideally suited for filtration. These fibers produce webs of low weight density compared to other types of fabrics. The micro sized fibers under process conditions of the present invention are readily bulked as described above.

The thickness of the web 16 is particularly important to the present invention. Thickness larger than about 25 mils are difficult to bulk and therefore do not form the pleats necessary for packing in the trumpet. Best performance is obtained with thickness no greater than 15 mils, preferably no greater than 8 mils.

Additives may be used in the polymer or web to enhance filterability and absorption.

PROCESS CONDITIONS

The process conditions include the convergence angle from the web full width at 16a (A as shown in FIG. 2) to minimum dimension at the trumpet 24b), the amount of stretching, the application of heat, and, optionally, the application of means to retain the diameter of the roving 25.

|  | BROAD RANGE | PREFERRED RANGE | MOST PREFERRED RANGE |
| --- | --- | --- | --- |
| convergence angle (A) | 10°–30° | 12°–25° | 15°–20° |
| Trumpet i.d. (inches)* | 0.1–0.7 | 0.15–0.4 | 0.2–0.35 |
| Trumpet area (sq. inches) | 0.01–1.0 | 0.02–0.5 | 0.03–0.3 |
| MD stretch (percent) | 15–300 | 20–100 | 40–75 |
| temperature (°C.) | 45–250 | 100–200 | 120–175 |

*Minimum dimension

The actual value of the above process conditions, of course, will depend to a degree on the web properties, temperature, and operating speed. The process conditions can readily be adapted to the web to achieve optimum conditions. The values shown above are interchangeable.

OPERATION

Web roll 15 is placed in slot 21 and web 16 is trained around roller 22 and fed through trumpet 24. (In practice, the trumpet 24 may be of split construction, permitting the opening of the trumpet, insertion of the web and closing of the trumpet about the web during process start-up.) The roving 25 is positioned between belts 27 and 31 and fed into collector 35.

The desired speeds of drive rollers 18 and 28 are set and operations are started up. The heated air is flowed through box 36.

As the unheated web 16 under tension converges in zone 16b, the main pleats form in the web.

As the heated web 16 is elongated between 16c and trumpet 24, a majority of the fibers are aligned in the MD and become longitudinal fibers 45a. The remaining fibers 45b are buckled with crossfibers extending generally transverse the MD. The web 16 thus narrows in the TD direction in addition to converging.

FIGS. 6 and 7, illustrate the initial effects of stretching the web having main pleats in zone 16c. The longitudinal fibers 45a are aligned in the MD and the crossfibers 45b are buckled (bent) as the web narrows. The longitudinal fibers 45a distributed among the crossfibers 45b pack closer together and the crossfibers 45b fold and protrude outwardly (in the Z direction) from the web adding Z direction bulk thereto.

As the web 16 continues in the heated zone, the number of pleats increase and their amplitude decreases due largely to the formation of secondary pleats. The number of pleats reaches a maximum immediately upstream of the trumpet 24.

Upon entering the trumpet 24 the pleats are randomly arranged in the form of a roving 25 as shown in FIG. 11. The bulking of the secondary pleats provide permeability in a direction parallel to the pleats. If the pleats 48 were not bulked, they would be close together without space for air flow as shown in FIG. 13 (i.e. a generally closed structure).

The roving 25 upon leaving the trumpet 24 has generally good stability with only a minor amount of spring back. However, dimensional stability can be increased by (a) heating the rod circumference to melt fuse at least a portion of the fibers, or (b) by applying an adhesive to the roving 25 at or downstream of the trumpet, or (c) wrapping the roving 25 with paper or film, or (d) annealing the rod within the trumpet, or (e) combination of the above. The roving 25 is collected and later can be cut into lengths suitable for application to cigarettes.

FILTER CHARACTERISTICS

Figure 12:
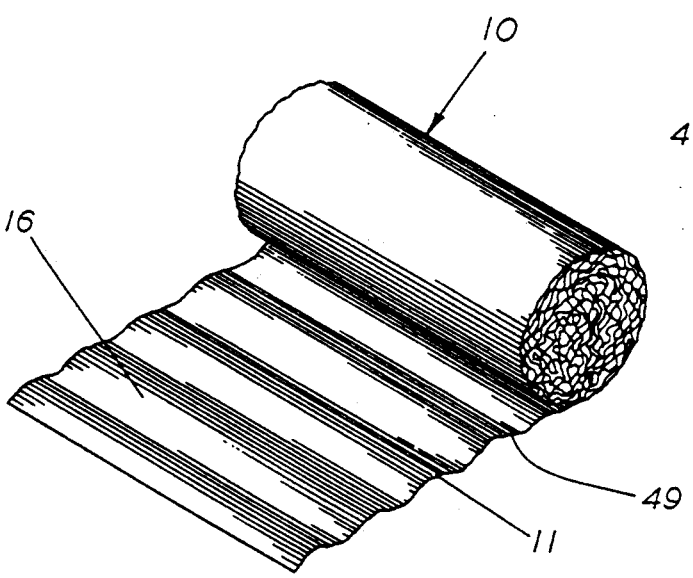
FIG. 12 is a perspective view of a cigarette filter manufactured by the present invention with portions spread apart to illustrate the pleated and micropleated configuration.

As shown in FIGS. 11 and 12, the cigarette filter 10 is made up of a plurality of bulked and pleated sections 48 and 49 bundled in a random serpentine pattern and extending longitudinally with respect to the filter axis. The amplitude of each pleat 11 in the filter will vary within a wide range depending on several factors including web thickness, texture, width, aspect ratio, and degree of stretching. The amplitude however, will generally be in the range of 2 to 15 web thickness. For a web thickness of 3 to 8 mils, for example, the pleat amplitude will vary from about 6 mils to 80 mils. Although it is not readily apparent from FIG. 11 that the secondary pleats are superimposed on the main pleats, FIG. 12 reveals this to be the case. When an end portion of web 16 of filter 11 is separated as illustrated in FIG. 12, the large main pleats 11 define an undulating disposition of the web 16, with the secondary pleats 49 creating an undulating shape to each leg of the main pleats 48. There generally are from 5 to 25 secondary pleats 49 in each leg of the main pleats 11.

The filter 10 cigarette application should have the following performance properties:

|  | BROAD RANGE | PREFERRED RANGE |
|---|---|---|
| filtration, % | 50-95 | 60-90 |
| Pressure Drop (mm H$_2$O) | 45-95 | 55-90 |

EXPERIMENTS

A roll of a meltblown web was used to prepare cigarette filters. The web had the following description:
material: polypropylene
fiber size: 7-10 micrometers (avg. diameter)
width: 20 inches
thickness: 0.004 inches
basis weight: 13 g/m$^2$ Meltblown cigarette filters made from the above web were separately processed at different draw ratios (MD stretch) to produce filters having two levels of filtration and pressure drop performance typically characterized in the industry as "Regulars" and "Lights". The meltblown roll 15 was placed on the apparatus illustrated in FIG. 1. The angle (A) of convergence was about 17 degrees. The diameter of the trumpet orifice means was 6 mm (0.24 inch). The temperature of the air blown onto the web 16 in the heated zone was 140 degrees C.

For the meltblown "Regular" filters, the web restraining roller 18 and the belt drive assembly 26 were adjusted so that the linear speed of the roving 25 through assembly 26 was 50% faster than that of the web 16 dispensed from roll 15, thereby providing a MD stretch of 50%. Most of the web elongation occurred in the heated zone.

For the meltblown "Lights" filters, the web restraining roller 18 and the belt drive assembly 26 were adjusted so that the linear speed of the roving 25 through assembly 26 was 25% faster than that of the web 16 dispensed from roll 15, thereby providing a MD stretch of 25%. This produced a filter having filtration and pressure drop in the "Lights" category. "Lights" generally have higher filtration efficiency at higher pressure drops. Most of the stretch occurred in the heated zone.

Roving 25 was collected and cut into lengths of approximately 25 mm and inserted into the bore of an impermeable plastic tube having a diameter of 8 mm. to simulate a cigarette filter.

Tobacco rods (i.e. cigarettes with filters removed) taken from popular commercial brands of Regular and Lights were inserted into the plastic tube and sealed to specimens of both Regular and Lights Meltblown filters produced according to the present invention. No air leakage into the filter was allowed in order to isolate the filtration efficiency performance from dilution effects. The commercial filters to which the meltblown filters were compared did not utilize dilution effects. Specimens of commercial filter cigarettes and specimens of the meltblown filters attached to tobacco rods were tested for filtration efficiency and pressure drop. Each filter cigarette specimen was attached to a vacuum tube from a smoking machine having a 0.225 micrometer (nominal pore size) membrane filter trap between the cigarette filter and pump. Each specimen was smoked with eight or nine 2.5 second puffs. Pressure drop across each filter with the tobacco rod removed was done on a Frazier air permeability machine at a nominal air flow rate of 15 cc/sec. Particle Removal Efficiencies (PRE) were determined as shown below.

$$PRE = (dWf/(dWf + dWt)) \times 100,$$

where
- dWf is the change in weight of the filter during each test;
- dWt is the change in weight of the trap during the test.

The Particle Removal Efficiency is thus a measurement of particulate material captured by the filter in comparison to total particulates collected by the filter and trap.

Experimental Particle Removal Efficiencies (undiluted) and pressure drop are shown in Table 1.

TABLE I

| Test No. | | PRE % | PRESSURE DROP* MM H$_2$O | RATIO PRE/PD |
|---|---|---|---|---|
| 1 | Commercial Filter, Regular | 54 | 59 | 0.91 |
| 2 | Commercial Filter, Lights | 67 | 83 | 0.81 |
| 3 | Meltblown, Regular | 66 | 55 | 1.20 |
| 4 | Meltblown, Lights | 88 | 87 | 1.01 |
| 5 | Meltblown with no MD Stretch | 51 | 55 | 0.93 |

*Pressure drop (PD) measured at nominal 15 cc/sec air flow through filter.

It is significant to note that the Meltblown Regular filters had 66% PRE compared to 54 and 51 for Commercial Regulars and the filter with no MD stretch, respectively. Meltblown Lights had 88% PRE compared to 67% for the Commercial Lights. It should also be observed that the pressure drops for the meltblown filters were comparable to the respective commercial filters. The effects of MD stretching on filtration efficiency can be seen by comparing Test Nos. 3 and 4 with Test No. 5.

The balance of PRE and pressure drop (expressed herein as MM H$_2$O) may be represented by the ratio of PRE/PD (herein "Ratio"). As shown in Table I, this Ratio for filters of the present invention are not less than 1 whereas all the other filters had ratios less than 1. The Ratio differs for the "Regular" and "Light" categories, because of the differences in the pressure drop. Regulars require less pressure drop than do the filters of the Light category.

For the filters of the present invention in the Regular category (pressure drop of 70 or less), the Ratio is preferably 0.95 or greater, most preferably 1.0 or greater. For filters of the present invention in the Light category (pressure drop above 70), the Ratio is preferably 0.85 and above and most preferably 0.90 and above. These Ratios clearly are not attainable by the commercially available filters as demonstrated by the Table I data.

The present invention has been described with particular reference to meltblown webs, which are preferred. However, it is emphasized that the invention also contemplates the use of other nonwoven webs (randomly collected fibers), spunbond webs in particular. Other nonwoven webs can be used provided they exhibit the necessary MD stretch and produce a filter having a balance of filter properties described herein.

Many variations of the present invention are possible without departing from the principles of the invention. For example, other mechanisms such as employing dilution air to the meltblown cigarette filter can be utilized for enhanced filtration.

Also, the web between the heated zone and the trumpet may be cooled (or permitted to cool) to heat set the pleats and maintain the micropleats as the web is pulled through the trumpet.

Another variation is to employ the present invention in-line with a nonwoven line, wherein the web is taken directly from the collector and processed by the present invention.

Still another variation includes the use of a special pattern on the collector screen of a nonwoven line to create score lines or lines of weakness on the web surface to predetermine micropleating folding. For example, the pattern may create intermittent longitudinal lines transversely offset to provide intermittent flow passages axially through the filter.

Finally, the roving made by the present invention may be utilized in other types of filters wherein the flow is transverse in the direction of the pleats and micropleats. For example, the roving may be arranged in a circular configuration as in an oil or air filter wherein the fluid flow is transverse the axis of the roving.

What is claimed is:

1. A process for manufacturing a filter roving suitable for fluid filters which comprises
   (a) restrainingly dispensing a thermoplastic nonwoven web in a planar disposition;
   (b) convergingly pulling the dispensed web successively through a heated zone and a restriction to produce a roving, the rate of roving movement exiting from the restriction in the machine direction being at least 15% higher than the rate at which the web is dispensed in the machine direction, whereby fibers of the web are oriented and the web is stretched in the machine direction by at least 15%.

2. The process of claim 1 wherein the nonwoven web is a meltblown web and the thermoplastic is a polyolefin.

3. The process of claim 2 wherein the polyolefin is selected from ethylene and propylene homopolymers and copolymers.

4. The process of claim 1 wherein the pulling of the web through the heated zone causes the web to bulk by at least 30%.

5. The process of claim 2 wherein the meltblown web has a width of between 6 and 60 inches and an aspect ratio of between 240 and 60,000.

6. The process of claim 1 wherein average diameter of the fibers of the nonwoven web is between 0.5 to 20 microns.

7. The process of claim 2 wherein the polyolefin has a rubbery zone and the hated zone is maintained at a temperature to heat the web therein to a temperature within or near the rubbery zone.

8. The process of claim 7 wherein the heated zone is maintained at a temperature at least equal to 10° C. below the onset of the rubbery zone and not greater than the maximum temperature of the rubbery zone.

9. A process for manufacturing filter roving which comprises
   (a) dispensing a flat thermoplastic meltblown web from a source;
   (b) moving the web through means for maintaining the web in a flat disposition; and
   (c) convergingly moving the web from the flat retaining means (i) through an unheated zone causing the web to form main pleats, (ii) through a heated zone to soften the fibers causing the web to form secondary pleats imposed on the main pleats, and (iii) through an restriction to cause the main and secondary pleats to randomly bundle forming a roving, the movement of the web through the orifice in the machine direction being at least 20% higher than the rate at which the web is dispensed from the source.

10. The process of claim 9 wherein the temperature in the heated zone is at least 20° C. above the temperature of the web at the source, and whereby the pleats formed in step (c) bulk the web by at least 20%.

11. The process of claim 9 wherein the web has edges which converge from the means for maintaining the web in a flat disposition to the restriction at an angle of convergence between 10 and 30 degrees.

12. A process for manufacturing a roving which comprises:
   (a) dispensing a meltblown web from a roll;
   (b) pulling the dispensed web successively
      (i). through means to maintain the web in a flat disposition.,
      (ii) convergingly through an unheated zone wherein main pleats are formed;
      (iii) convergingly through a heated zone wherein fibers of the web are oriented in the machine direction and secondary pleats are formed on the main pleats; and
      (iv) through a trumpet to form a roving; and the rate of movement of the web through the trumpet being between 20 and 300% faster than the rate of web dispensation in the machine direction.

13. The process of claim 12 wherein the meltblown web is a polyolefin.

14. The process of claim 13 wherein the polyolefin is an ethylene or propylene polymer or copolymer and the web has a width of between 12 and 60 inches and an aspect ratio of between 800 to 24,000.

15. The process of claim 12 wherein the web has fibers of average diameters between 1 and 10 microns and basis weight of between 4 to 26 gr./m².

16. A process for manufacturing a roving suitable for use as a cigarette filter, which comprises:
   (a) restrainingly dispensing a meltblown thermoplastic web in a flat disposition having an average fiber diameter between 1 and 10 microns and a width of between 12 and 60 inches, a thickness between 2 and 15 mils, and a basis weight between 4 and 26 g/m²; and
   (b) pulling the web convergingly through nonheated zone and a heated zone, and an orifice, the heated zone being maintained at a temperature at least 35° C. above the temperature of the web at ambient conditions to soften and enhance orientation of the fibers; the orifice being sized to form a roving having a diameter of the size for use as a cigarette filter, the rate of movement of the web through the orifice being 15 to 100% faster than the rate that the web is dispensed.

17. A filter comprising
   (a) a cylindrical body composed of a plurality of pleated meltblown thermoplastic web randomly bundled in a cylinder wherein the pleats extend parallel to the axis of the cylinder, being characterized by oriented longitudinal fibers and buckled crossfibers, the crossfibers extending outwardly from the thickness of the longitudinal fibers and impart bulk to the web, thereby providing permeability for the fluid; and
   (b) a wrapper extending around the circumference of a longitudinal portion at least of the cylindrical body; whereby fluid flow is axially through the cylindrical body between and through the pleats.

18. The filter of claim 17 wherein the meltblown web is made of a polyolefin and wherein the filter body has a diameter of between 0.16 to 0.35 inches.

19. The filter of claim 17 wherein the fibers of the meltblown web have an average diameter between 1 and 10 microns.

20. The filter of claim 17 wherein the filter is a cigarette filter and has the following non-diluted filtering characteristics: a ratio of Particle Removal Efficiency to pressure drop per 25 mm of filter length of (i) 0.95 or greater at pressure drop of 70 mm $H_2O$ or less; or (ii) 0.85 or greater at pressure drop of greater than 70 mm $H_2O$.

21. The filter of claim 20 wherein the ratio is 1.0 or more at all filter pressure drops.

22. The filter of claim 17 wherein the meltblown web is made of polyolefin fibers.

23. The filter of claim 22 wherein the polyolefin is selected from ethylene and propylene homopolymers and copolymers and mixtures thereof.

24. A cigarette filter comprising a cylindrical body composed of a bundle of overlapped serpentine meltblown web portions which extend axially through the body, said web portions being composed of stretch oriented longitudinal fibers and crossfibers which extend transversely through the longitudinal fibers and have crossfiber portions which protrude outwardly from the web thickness defined by the longitudinal fibers, said protruding crossfibers adding bulk to the web, said longitudinal fibers and crossfibers having an average diameter of between 0.5 and 20 microns.

25. The cigarette filter of claim 24 wherein the serpentine meltblown web portions include secondary pleats which prevent the overlapped portions from engaging one another in a flat disposition, the secondary pleats thereby providing smoke passages axially through the body.

26. Apparatus for manufacturing a roving from a nonwoven web which comprises
   (a) means for restrainingly dispensing a web from a nonwoven web source;
   (b) means for maintaining a portion of the dispensed web in a flat disposition;
   (c) a trumpet for bundling the web to form a roving
   (d) means operative on the roving for convergingly pulling the web from the flat disposition maintaining means through the trumpet; the converging angles being between 10° to 30° and causing the formation of main pleats; and
   (e) means for heating an intermediate portion of the converging web so that the pulling force imparts stretching and orientation of fibers of the intermediate portion of the web thereby enhancing formation of secondary pleats in the web.

* * * * *